(12) United States Patent
Blanz et al.

(10) Patent No.: US 10,511,352 B2
(45) Date of Patent: Dec. 17, 2019

(54) CQI REPORTING FOR MIMO TRANSMISSION IN A WIRELESS COMMUNICATION SYSTEM

(71) Applicant: QUALCOMM Incorporated, San Diego, CA (US)

(72) Inventors: Josef Johannes Blanz, Forst (DE); Ivan Jesus Fernandez-Corbaton, Karlsruhe (DE)

(73) Assignee: QUALCOMM Incorporated, San Diego, CA (US)

( * ) Notice: Subject to any disclaimer, the term of this patent is extended or adjusted under 35 U.S.C. 154(b) by 959 days.

(21) Appl. No.: 14/446,894

(22) Filed: Jul. 30, 2014

(65) Prior Publication Data
US 2014/0334433 A1 Nov. 13, 2014

Related U.S. Application Data

(62) Division of application No. 13/197,365, filed on Aug. 3, 2011, now Pat. No. 8,831,667, which is a division
(Continued)

(51) Int. Cl.
*H04B 7/04* (2017.01)
*H04L 1/00* (2006.01)
(Continued)

(52) U.S. Cl.
CPC ............ *H04B 7/04* (2013.01); *H04L 1/0028* (2013.01); *H04W 52/346* (2013.01); *H04W 52/42* (2013.01)

(58) Field of Classification Search
CPC ...... H04B 7/04; H04L 1/0028; H04W 52/346; H04W 52/42
(Continued)

(56) References Cited

U.S. PATENT DOCUMENTS 6,112,326 A * 8/2000 Khayrallah ........... H03M 13/23
714/790
6,785,341 B2 8/2004 Walton et al.
(Continued)

FOREIGN PATENT DOCUMENTS

CN 1406033 A 3/2003
CN 1462124 A 12/2003
(Continued)

OTHER PUBLICATIONS

Qualcomm Europe et al: "CQI reporting for FDD MIMO", 3GPP Draft; R1-070571, 3rd Generation Partnership Project (3GPP), Mobile Competence Centre ; 650, Route Des Lucioles ; F-06921 Sophia-Antipolis Cedex ; France, vol. RAN WG1, No. Sorrento, Italy; Jan. 20, 2007, Jan. 20, 2007 (Jan. 20, 2007), XP050104592, [retrieved on Jan. 20, 2007] Introduction 6A.2 Channel quality inficator (CQI) definition.
(Continued)

*Primary Examiner* — Andrew Lai
*Assistant Examiner* — Harry H Kim
(74) *Attorney, Agent, or Firm* — Patterson & Sheridan, L.L.P.

(57) ABSTRACT

Techniques for determining and reporting channel quality indicator (CQI) information are described. A user equipment (UE) may determine precoding information and channel quality information to be reported to a base station. The UE may jointly encode the precoding information and the channel quality information to obtain coded data. The UE may send the coded data to the base station.

17 Claims, 6 Drawing Sheets

Related U.S. Application Data of application No. 11/969,060, filed on Jan. 3, 2008, now Pat. No. 8,825,099.

(60) Provisional application No. 60/884,202, filed on Jan. 9, 2007.

(51) Int. Cl.
  *H04W 52/34* (2009.01)
  *H04W 52/42* (2009.01)

(58) Field of Classification Search
  USPC .......................................................... 370/329
  See application file for complete search history.

(56) References Cited

U.S. PATENT DOCUMENTS

| | | | |
|---|---|---|---|
| 6,859,446 B1 | 2/2005 | Gopalakrishnan et al. | |
| 7,197,021 B2 | 3/2007 | Seo et al. | |
| 7,403,513 B2 | 7/2008 | Lee et al. | |
| 7,424,305 B2 | 9/2008 | Yamazaki et al. | |
| 7,447,515 B2* | 11/2008 | Han | H04W 52/325 370/328 |
| 7,773,557 B2 | 8/2010 | Grant et al. | |
| 8,477,734 B2 | 7/2013 | Sambhwani et al. | |
| 8,825,099 B2* | 9/2014 | Blanz | H04B 7/04 370/252 |
| 8,831,667 B2* | 9/2014 | Blanz | H04B 7/04 370/252 |
| 8,837,337 B2* | 9/2014 | Blanz | H04J 13/0044 370/310 |
| 2002/0009127 A1 | 1/2002 | Misra et al. | |
| 2003/0039217 A1 | 2/2003 | Seo et al. | |
| 2003/0123396 A1 | 7/2003 | Seo et al. | |
| 2004/0001472 A1 | 1/2004 | Kwak et al. | |
| 2005/0002467 A1* | 1/2005 | Seo | H04B 7/061 375/267 |
| 2005/0096080 A1 | 5/2005 | Choi et al. | |
| 2005/0128973 A1 | 6/2005 | Yagihashi | |
| 2005/0181739 A1 | 8/2005 | Krasny et al. | |
| 2005/0181816 A1* | 8/2005 | Han | H04W 52/325 455/522 |
| 2005/0195885 A1* | 9/2005 | Misra | H04B 1/707 375/130 |
| 2005/0201474 A1* | 9/2005 | Cho | H04L 1/0003 375/260 |
| 2005/0207367 A1* | 9/2005 | Onggosanusi | H04L 1/0003 370/315 |
| 2005/0250512 A1* | 11/2005 | Zhang | H04W 24/02 455/453 |
| 2005/0283715 A1* | 12/2005 | Sutivong | H04L 1/0045 714/790 |
| 2006/0013328 A1* | 1/2006 | Zhang | H04B 1/7105 375/267 |
| 2006/0030323 A1 | 2/2006 | Ode et al. | |
| 2006/0098568 A1* | 5/2006 | Oh | H04B 7/0417 370/206 |
| 2006/0128309 A1* | 6/2006 | Dateki | H04B 7/0613 455/41.3 |
| 2006/0233127 A1* | 10/2006 | Derryberry | H04L 1/0026 370/328 |
| 2006/0240858 A1* | 10/2006 | Yamazaki | H04W 52/322 455/522 |
| 2006/0255989 A1 | 11/2006 | Kim et al. | |
| 2006/0270433 A1 | 11/2006 | Kelton et al. | |
| 2007/0064664 A1* | 3/2007 | Kwon | H04L 27/2647 370/343 |
| 2007/0153672 A1 | 7/2007 | Terry et al. | |
| 2007/0160162 A1 | 7/2007 | Kim et al. | |
| 2007/0253508 A1 | 11/2007 | Zhou et al. | |
| 2007/0286124 A1 | 12/2007 | Grant et al. | |
| 2008/0080431 A1* | 4/2008 | Zeira | H04B 7/0634 370/333 |
| 2008/0080634 A1* | 4/2008 | Kotecha | H04B 7/0417 375/267 |
| 2008/0080635 A1* | 4/2008 | Hugl | H04L 1/0028 375/267 |
| 2008/0096488 A1* | 4/2008 | Cho | H04B 7/0632 455/69 |
| 2008/0130711 A1* | 6/2008 | Catreux-Erceg | H04L 1/0026 375/130 |
| 2008/0165875 A1* | 7/2008 | Mundarath | H04B 7/0417 375/262 |
| 2008/0175194 A1 | 7/2008 | Blanz et al. | |
| 2008/0188259 A1 | 8/2008 | Blanz et al. | |
| 2009/0196193 A1* | 8/2009 | Frenger | H04W 72/1242 370/252 |
| 2009/0245212 A1 | 10/2009 | Sambhwani et al. | |
| 2010/0278152 A1 | 11/2010 | Andreozzi et al. | |
| 2011/0286353 A1 | 11/2011 | Blanz et al. | |
| 2011/0305204 A1* | 12/2011 | Fan | H04B 7/022 370/328 |
| 2012/0087271 A1 | 4/2012 | Blanz et al. | |

FOREIGN PATENT DOCUMENTS

| | | | |
|---|---|---|---|
| CN | 1812280 A | 8/2006 | |
| CN | 101217682 | * 1/2007 | ........... H04B 7/0632 |
| JP | 2004343524 A | 12/2004 | |
| JP | 2006067099 A | 3/2006 | |
| JP | 2007515850 A | 6/2007 | |
| RU | 2003135858 A | 6/2005 | |
| WO | WO-01089099 | 11/2001 | |
| WO | WO-02093784 A1 | 11/2002 | |
| WO | WO-2005002111 A2 | 1/2005 | |
| WO | WO-2005099125 A1 | 10/2005 | |
| WO | WO-2006116704 A2 | 11/2006 | |

OTHER PUBLICATIONS

3GPP TS 25.214, V.7.3.0, 3rd Generation Partnership Project; Technical Specification Group Radio Access Network; Physical layer procedures (FDD) (Release 7), Dec. 2006.

3rd Generation Partnership Project, "Radio Resource Control (RRC); Protocol Specification", 3GPP TS 25.331 V5.20.0 Sep. 2007.

Co-pending U.S. Appl. No. 09/570,209, filed May 12, 2000.

European Search Report—EP09165095—Search Authority—Munich—dated Mar. 6, 2008.

European Search Report—EP12167542—Search Authority—Hague—dated May 31, 2012.

International Search Report & Written Opinion—PCT/US2008/050543—International Search Authority, European Patent Office—dated May 16, 2008.

International Search Report & Written Opinion , PCT/US2008/050793, International Search Authority, European Patent Office, dated Dec. 18, 2008.

Pedersen K I et al: "Network performance of mixed traffic on high speed downlink packet access and dedicated channels in WCDMA" Vehicular Technology Conference, 2004. VTC2004—Fall. 2004 IEEE 60th Los Angeles, CA, USA Sep. 26-29, 2004, Piscataway, NJ, USA,IEEE, vol. 6, Sep. 26, 2004 (Sep. 26, 2004), pp. 4496-4500, XP01 0790245 ISBN: 978-0-7803-8521-4.

Qualcomm Europe : "Definition of MIMO operation on Hs-PDSCH, preferred precoding and CQI reporting procedures, modified CQI tables", Change Request, 3GPP TSG-RAN WG1 Meeting #48, 3GPP Darft; R1-070815, St. Luis, Missouri, USA, Feb. 12-16, 2007.

Qualcomm Europe: "CQI reporting for FDD MIMO", 3GPP Draft; R1-070513, 3rd Generation Partnership Project (3GPP), Mobile Competence Centre; 650, Route Des Lucioles; F-06921 Sophia-Antipolis Cedex; France, vol. RAN WG1, No. Sorrento, Italy; Jan. 10, 2007, Jan. 10, 2007 (Jan. 10, 2007), XP050104542, [retrieved on Jan. 10, 2007] the whole document.

Qualcomm Europe et al., "Definition of MIMO operation on Hs-PDSCH, preferred precoding and CQI reporting procedures, modified CQI tables", 3GPP Draft; R1-070514, 3rd Generation Partnership Project (3GPP), Mobile Competence Centre; 650, Route

(56) References Cited

OTHER PUBLICATIONS

Des Lucioles; F-86921 Sophia-Antipolis Cedex; France, vol. RAN WG1, No. Sorrento, Italy; Jan. 10, 2087, Jan. 10, 2007 (Jan. 10, 2007), XP050104543, [retrieved on Jan. 18, 2007] the whole document.
Taiwan Search Report—TW097100930—TIPO—dated Apr. 25, 2011.
Taiwan Search Report—TW097101212—TIPO—dated May 23, 2011.

* cited by examiner

CQI REPORTING FOR MIMO TRANSMISSION IN A WIRELESS COMMUNICATION SYSTEM

CLAIM OF PRIORITY UNDER 35 U.S.C. § 119

The present Application for Patent is a divisional of U.S. application Ser. No. 13/197,365, entitled "CQI REPORTING FOR MIMO TRANSMISSION IN A WIRELESS COMMUNICATION SYSTEM," filed Aug. 3, 2011, which is a divisional of U.S. application Ser. No. 11/969,060, entitled "CQI REPORTING FOR MIMO TRANSMISSION IN A WIRELESS COMMUNICATION SYSTEM," filed Jan. 3, 2008, which claims priority to Provisional U.S. Application Ser. No. 60/884,202, entitled "CQI REPORTING FOR FDD MIMO," filed Jan. 9, 2007, all three assigned to the assignee hereof, and expressly incorporated herein by reference.

BACKGROUND

I. Field

The present disclosure relates generally to communication, and more specifically to techniques for reporting channel quality indicator (CQI) information in a wireless communication system.

II. Background

In a wireless communication system, a Node B may utilize multiple (T) transmit antennas for data transmission to a user equipment (UE) equipped with multiple (R) receive antennas. The multiple transmit and receive antennas form a multiple-input multiple-output (MIMO) channel that may be used to increase throughput and/or improve reliability. For example, the Node B may transmit up to T data streams simultaneously from the T transmit antennas to improve throughput. Alternatively, the Node B may transmit a single data stream from all T transmit antennas to improve reception by the UE. Each data stream may carry one transport block of data in a given transmission time interval (TTI). Hence, the terms "data stream" and "transport block" may be used interchangeably.

Good performance (e.g., high throughput) may be achieved by sending each transport block at the highest possible rate that still allows the UE to reliably decode the transport block. The UE may estimate signal-to-interference-and-noise ratios (SINRs) of each possible combination of transport blocks that might be transmitted and may then determine CQI information based on the estimated SINRs of the best combination of transport blocks. The CQI information may convey a set of processing parameters for each transport block. The UE may send the CQI information to the Node B. The Node B may process one or more transport blocks in accordance with the CQI information and send the transport block(s) to the UE.

Data transmission performance may be dependent on accurate determination and reporting of CQI information by the UE. There is therefore a need in the art for techniques to accurately determine and report CQI information.

SUMMARY

Techniques for determining and reporting CQI information for a MIMO transmission are described herein. In an aspect, a UE may determine CQI information based on a transmit power per channelization code, $P_{OVSF}$, that is known by both the UE and a Node B. For a MIMO transmission sent using code division multiplexing, the SINR of a transport block may be dependent on $P_{OVSF}$ but may not be a linear function of $P_{OVSF}$. The use of a known $P_{OVSF}$ may improve accuracy in SINR estimation. The UE may determine $P_{OVSF}$ based on (i) the available transmit power, which may be obtained via signaling from the Node B, and (ii) a designated number of channelization codes, which may be a known value or obtained via signaling. The UE may assume a uniform distribution of the available transmit power across multiple (e.g., two) transport blocks and also across the designated number of channelization codes to obtain $P_{OVSF}$. The UE may then estimate the SINRs of the transport blocks based on $P_{OVSF}$. The UE may determine CQI indices for the transport blocks based on the SINRs and a CQI mapping table for the designated number of channelization codes. The UE may send the CQI indices as CQI information to the Node B.

The Node B may send multiple transport blocks in a MIMO transmission to the UE based on the CQI information received from the UE. In one design, the Node B may send the transport blocks with the designated number of channelization codes at $P_{OVSF}$. In another design, the Node B may send the transport blocks with a second number of channelization codes at $P_{OVSF}$ and may scale the sizes of the transport blocks based on the designated number of channelization codes and the second number of channelization codes. In yet another design, the Node B may scale $P_{OVSF}$ based on the designated number of channelization codes and the second number of channelization codes. The Node B may then send the transport blocks with the second number of channelization codes at the scaled $P_{OVSF}$.

In certain aspects, a UE may determine precoding information and channel quality information and jointly encode the precoding information and the channel quality information to obtain coded data. The UE may then send the coded data to a base station.

Various aspects and features of the disclosure are described in further detail below.

DETAILED DESCRIPTION

The techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. The terms "system" and "network" are often used interchangeably. A CDMA system may implement a radio technology such Universal Terrestrial Radio Access (UTRA), cdma2000, etc. UTRA includes Wideband-CDMA (W-CDMA) and other CDMA variants. cdma2000 covers IS-2000, IS-95 and IS-856 standards. UTRA is part of Universal Mobile Telecommunication System (UMTS), and both are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, the techniques are described below for UMTS, and UMTS terminology is used in much of the description below.

Figure 1:
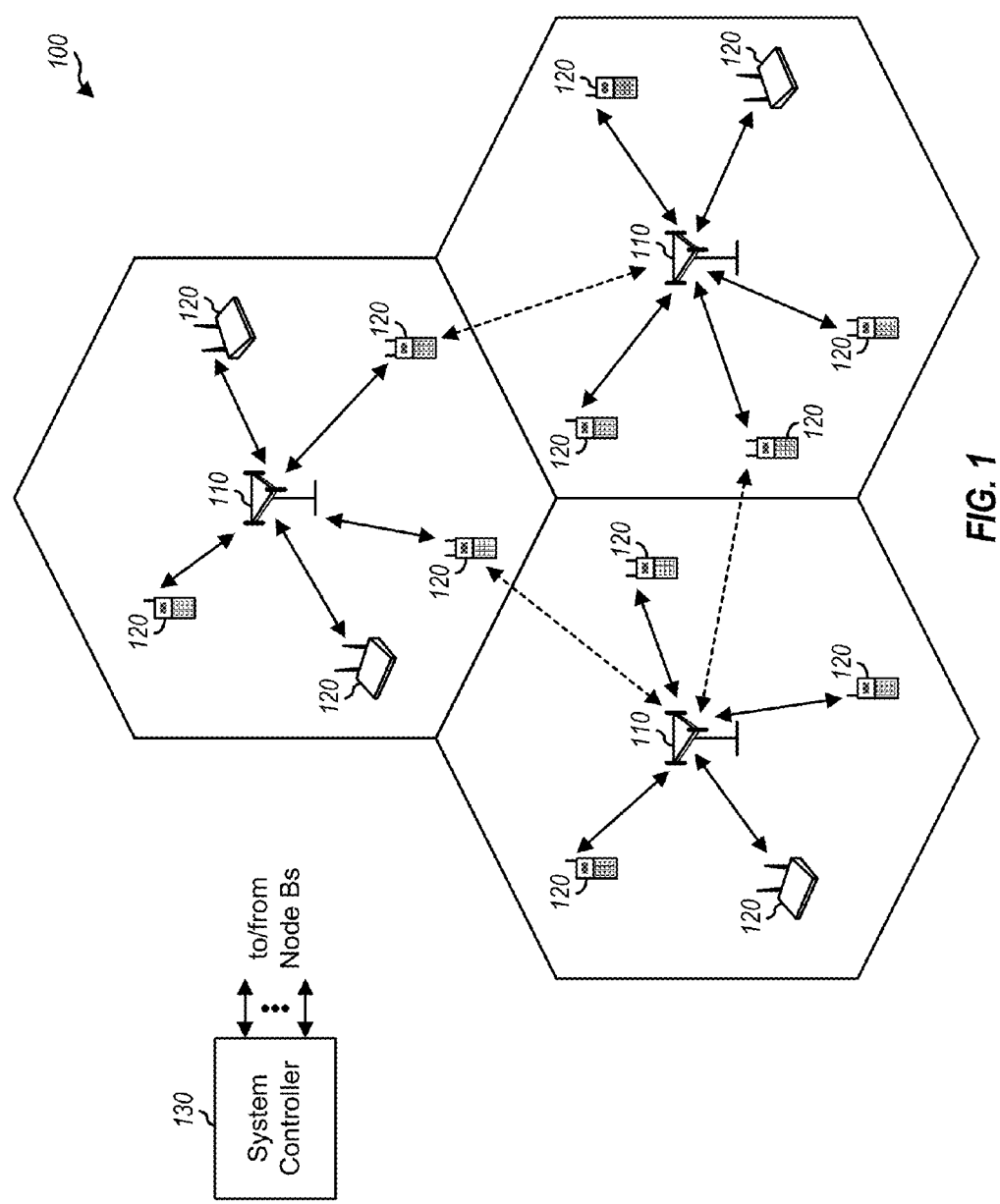
FIG. 1 shows a wireless communication system.

FIG. 1 shows a wireless communication system 100 with multiple Node Bs 110 and multiple user equipments (UEs) 120. System 100 may also be referred to as a Universal Terrestrial Radio Access Network (UTRAN) in UMTS. A Node B is generally a fixed station that communicates with the UEs and may also be referred to as an evolved Node B (eNode B), a base station, an access point, etc. Each Node B 110 provides communication coverage for a particular geographic area and supports communication for the UEs located within the coverage area. A system controller 130 couples to Node Bs 110 and provides coordination and control for these Node Bs. System controller 130 may be a single network entity or a collection of network entities.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless device, a handheld device, a wireless modem, a laptop computer, etc.

Figure 2:
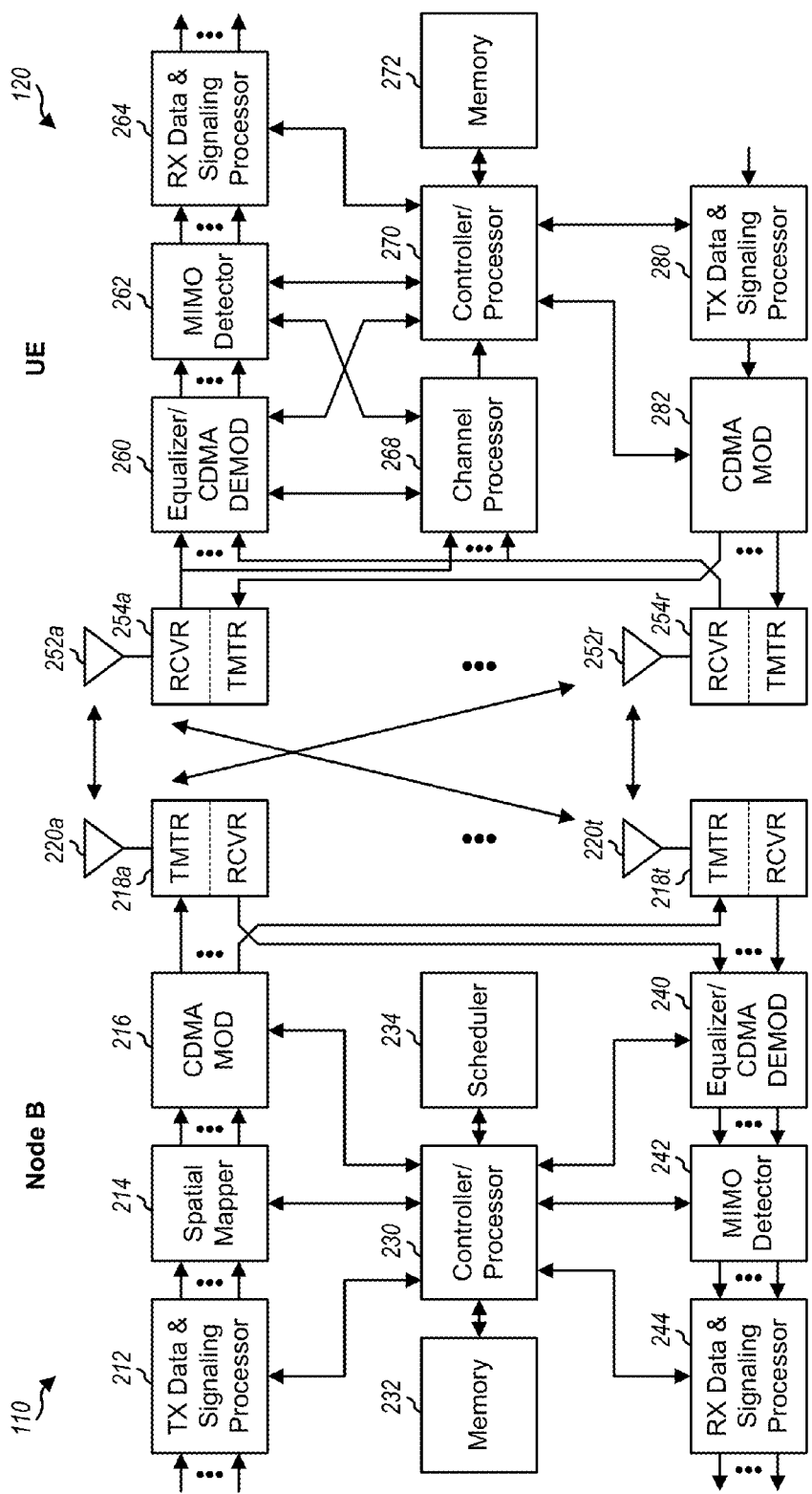
FIG. 2 shows a block diagram of a Node B and a UE.

FIG. 2 shows a block diagram of a design of one Node B 110 and one UE 120. In this design, Node B 110 is equipped with multiple (T) antennas 220a through 220t, and UE 120 is equipped with multiple (R) antennas 252a through 252r. A MIMO transmission may be sent from the T transmit antennas at Node B 110 to the R receive antennas at UE 120.

At Node B 110, a transmit (TX) data and signaling processor 212 may receive data from a data source (not shown) for all scheduled UEs. Processor 212 may process (e.g., format, encode, interleave, and symbol map) the data for each UE and provide data symbols, which are modulation symbols for data. Processor 212 may also process signaling and provides signaling symbols, which are modulation symbols for signaling. A spatial mapper 214 may precode the data symbols for each UE based on a precoding matrix or vector for that UE and provide output symbols for all UEs. A CDMA modulator (MOD) 216 may perform CDMA processing on the output symbols and signaling symbols and may provide T output chip streams to T transmitters (TMTR) 218a through 218t. Each transmitter 218 may process (e.g., convert to analog, filter, amplify, and frequency upconvert) its output chip stream and provide a downlink signal. T downlink signals from T transmitters 218a through 218t may be sent via T antennas 220a through 220t, respectively.

At UE 120, R antennas 252a through 252r may receive the downlink signals from Node B 110 and provide R received signals to R receivers (RCVR) 254a through 254r, respectively. Each receiver 254 may process (e.g., filter, amplify, frequency downconvert, and digitize) its received signal and provide samples to a channel processor 268 and an equalizer/CDMA demodulator (DEMOD) 260. Processor 268 may derive coefficients for a front-end filter/equalizer and coefficients for one or more combiner matrices. Unit 260 may perform equalization with the front-end filter and CDMA demodulation and may provide filtered symbols. A MIMO detector 262 may combine the filtered symbols across spatial dimension and provide detected symbols, which are estimates of the data symbols and signaling symbols sent to UE 120. A receive (RX) data and signaling processor 264 may process (e.g., symbol demap, deinterleave, and decode) the detected symbols and provide decoded data and signaling. In general, the processing by equalizer/CDMA demodulator 260, MIMO detector 262, and RX data and signaling processor 264 is complementary to the processing by CDMA modulator 216, spatial mapper 214, and TX data and signaling processor 212, respectively, at Node B 110.

Channel processor 268 may estimate the response of the wireless channel from Node B 110 to UE 120. Processor 268 and/or 270 may process the channel estimate to obtain feedback information, which may include precoding control indicator (PCI) information and CQI information. The PCI information may convey the number of transport blocks to send in parallel and a specific precoding matrix or vector to use for precoding the transport block(s). A transport block may also be referred to as a packet, a data block, etc. The CQI information may convey processing parameters (e.g., the transport block size and modulation scheme) for each transport block. Processor 268 and/or 270 may evaluate different possible precoding matrices and vectors that can be used for data transmission and may select a precoding matrix or vector that can provide the best performance, e.g., the highest overall throughput. Processor 268 and/or 270 may also determine the CQI information for the selected precoding matrix or vector.

The feedback information and data to send on the uplink may be processed by a TX data and signaling processor 280, further processed by a CDMA modulator 282, and conditioned by transmitters 254a through 254r to generate R uplink signals, which may be transmitted via antennas 252a through 252r, respectively. The number of transmit antennas at UE 120 may or may not be equal to the number of receive antennas. For example, UE 120 may receive data using two antennas but may transmit the feedback information using only one antenna. At Node B 110, the uplink signals from UE 120 may be received by antennas 220a through 220t, conditioned by receivers 218a through 218t, processed by an equalizer/CDMA demodulator 240, detected by a MIMO detector 242, and processed by an RX data and signaling processor 244 to recover the feedback information and data sent by UE 120. The number of receive antennas at Node B 110 may or may not be equal to the number of transmit antennas.

Controllers/processors 230 and 270 may direct the operation at Node B 110 and UE 120, respectively. Memories 232 and 272 may store program code and data for Node B 110 and UE 120, respectively. A scheduler 234 may schedule UEs for downlink and/or uplink transmission, e.g., based on the feedback information received from the UEs.

In UMTS, data for a UE may be processed as one or more transport channels at a higher layer. The transport channels may carry data for one or more services such as voice, video, packet data, etc. The transport channels may be mapped to physical channels at a physical layer. The physical channels may be channelized with different channelization codes and may thus be orthogonal to one another in the code domain. UMTS uses orthogonal variable spreading factor (OVSF) codes as the channelization codes for the physical channels.

3GPP Release 5 and later supports High-Speed Downlink Packet Access (HSDPA), which is a set of channels and procedures that enable high-speed packet data transmission on the downlink. For HSDPA, a Node B may send data on a High Speed Downlink Shared Channel (HS-DSCH), which is a downlink transport channel that is shared by all UEs in both time and code. The HS-DSCH may carry data for one or more UEs in each TTI. For UMTS, a 10 millisecond (ms) radio frame is partitioned into five 2-ms subframes, each subframe includes three slots, and each slot has a duration of 0.667 ms. A TTI is equal to one subframe for HSDPA and is the smallest unit of time in which a UE may be scheduled and served. The sharing of the HS-DSCH may change dynamically from TTI to TTI.

Table 2 lists some downlink and uplink physical channels used for HSDPA and provides a short description for each physical channel.

TABLE 1

| Link | Channel | Channel Name | Description |
| --- | --- | --- | --- |
| Downlink | HS-PDSCH | High Speed Physical Downlink Shared Channel | Carry data sent on the HS-DSCH for different UEs. |
| Downlink | HS-SCCH | Shared Control Channel for HS-DSCH | Carry signaling for the HS-PDSCH. |
| Uplink | HS-DPCCH | Dedicated Physical Control Channel for HS-DSCH | Carry feedback for downlink transmission in HSDPA. |

Figure 3:
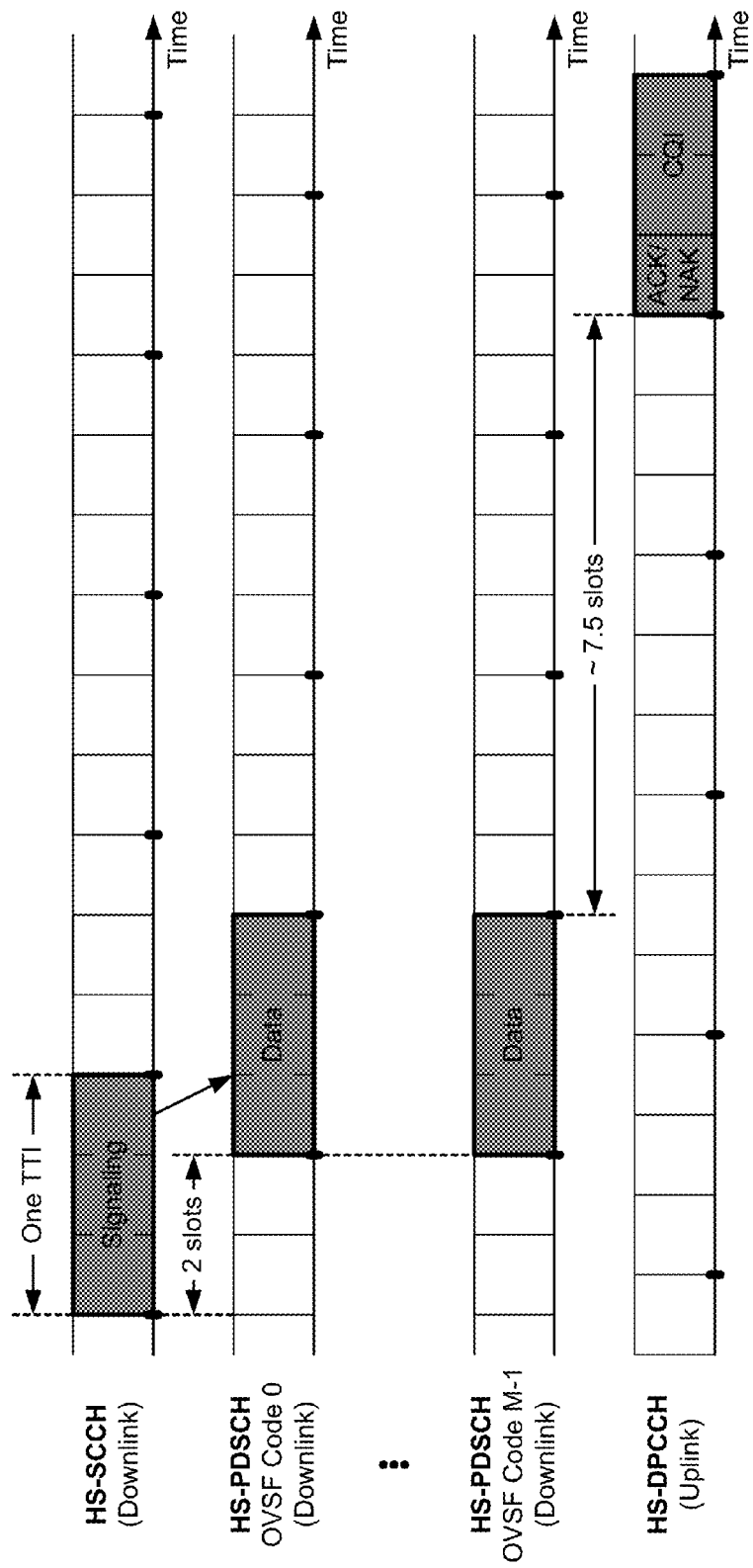
FIG. 3 shows a timing diagram for a set of physical channels.

FIG. 3 shows a timing diagram for the physical channels used for HSDPA. For HSDPA, a Node B may serve one or more UEs in each TTI. The Node B may send signaling for each scheduled UE on the HS-SCCH and may send data on the HS-PDSCH two slots later. The Node B may use a configurable number of 128-chip OVSF codes for the HS-SCCH and may use up to fifteen 16-chip OVSF codes for the HS-PDSCH. HSDPA may be considered as having a single HS-PDSCH with up to fifteen 16-chip OVSF codes and a single HS-SCCH with a configurable number of 128-chip OVSF codes. Equivalently, HSDPA may be considered as having up to fifteen HS-PDSCHs and a configurable number of HS-SCCHs, with each HS-PDSCH having a single 16-chip OVSF code and each HS-SCCH having a single 128-chip OVSF code. The following description uses the terminology of a single HS-PDSCH and a single HS-SCCH.

Each UE that might receive data on the HS-PDSCH may process up to four 128-chip OVSF codes for the HS-SCCH in each TTI to determine whether signaling has been sent for that UE. Each UE that is scheduled in a given TTI may process the HS-PDSCH to recover data sent to that UE. Each scheduled UE may send either an acknowledgement (ACK) on the HS-DPCCH if a transport block is decoded correctly or a negative acknowledgement (NACK) otherwise. Each UE may also send PCI and CQI information on the HS-DPCCH to the Node B.

FIG. 3 also shows timing offsets between the HS-SCCH, the HS-PDSCH, and the HS-DPCCH at a UE. The HS-PDSCH starts two slots after the HS-SCCH. The HS-DPCCH starts approximately 7.5 slots from the end of the corresponding transmission on the HS-PDSCH.

A UE may send CQI information to allow a Node B to process and transmit data to the UE. In general, CQI information may be sent for any number of transport blocks or data streams. For clarity, much of the description below assumes that one or two transport blocks may be sent in a given TTI and that the CQI information may be for one or two transport blocks. The CQI information should have the following characteristics:

Allow for reporting of a CQI index for each transport block,

Provide sufficient number of levels for the CQI index for each transport block, and Support flexible reporting of CQI information for one or two transport blocks.

The Node B may transmit two transport blocks to the UE using one of multiple possible precoding matrices or may transmit a single transport block using one column/vector of one of the possible precoding matrices. The UE may evaluate data performance for different possible precoding matrices and vectors that can be used by the Node B for data transmission to the UE. For each precoding matrix or vector, the UE may estimate the quality of each transport block, which may be given by any suitable metric. For clarity, the following description assumes that the quality of each transport block is given by an equivalent SINR for an additive white Gaussian noise (AWGN) channel, which is referred to as simply SINR in the description below. The UE may determine data performance (e.g., the overall throughput) for each precoding matrix or vector based on the SINR(s) of all transport block(s). After evaluating all possible precoding matrices and vectors, the UE may select the precoding matrix or vector that provides the best data performance.

For each possible precoding matrix, the UE may estimate the SINRs of two transport blocks that may be sent in parallel with that precoding matrix. The transport block with the higher SINR may be referred to as the primary transport block, and the transport block with the lower SINR may be referred to as the secondary transport block. The SINR of each transport block may be dependent on various factors such as (i) the transmit power available for data transmission on the HS-PDSCH, (ii) the number of OVSF codes used for the data transmission, (iii) channel conditions, which may be given by channel gains and noise variance, (iv) the type of receiver processing performed by the UE, (v) the order in which the transport blocks are recovered if successive interference cancellation (SIC) is performed by the UE, and (vi) possibly other factors.

The SINR of transport block i, $SINR_i$, may be given as:

$$SINR_i = F(P_{OVSF}, X_i), \quad \text{Eq (1)}$$

where $P_{OVSF}$ is the transmit power per OVSF code for the HS-PDSCH, $X_i$ includes all other parameters that affect SINR, and $F( )$ is an SINR function applicable for the UE.

The SINR function may be dependent on the receiver processing at the UE and may not be a linear function of $P_{OVSF}$. Thus, if $P_{OVSF}$ increases by G decibel (dB), then the amount of improvement in SINR may not be accurately known based solely on the G dB increase in $P_{OVSF}$. This non-linear relationship between $P_{OVSF}$ and SINR may be due to code-reuse interference, which is interference between two transport blocks using the same OVSF codes. Furthermore, the SINR function may not be known at the Node B.

In an aspect, the UE may estimate SINR based on a transmit power per OVSF code that is known by both the UE and the Node B. In one design, the known $P_{OVSF}$ may be determined based on knowledge or assumption of (i) the transmit power $P_{HSPDSCH}$ available for data transmission on the HS-PDSCH, (ii) a designate number of OVSF codes, M, for the HS-PDSCH, and (iii) uniform distribution of the available transmit power across the M OVSF codes for each transport block.

The available transmit power $P_{HSPDSCH}$ for the HS-PDSCH may be provided by higher layer signaling and/or some other mechanism, e.g., on a regular basis or whenever there is a change. In one design, the available transmit power $P_{HSPDSCH}$ may be determined as follows:

$$P_{HSPDSCH} = P_{CPICH} + \Gamma, \text{ in dB} \quad \text{Eq (2)}$$

where $P_{CPICH}$ is the transmit power of a Common Pilot Channel (CPICH), and $\Gamma$ is a power offset that may be signaled by higher layer.

In one design, the available transmit power may be distributed evenly to two transport blocks, and $P_{OVSF}$ may be the same for both transport blocks. In another design, a particular percentage of the available transmit power may be distributed to the primary transport block, the remaining transmit power may be distributed to the secondary transport block, and POVSF may be different for the two transport blocks.

In one design, the designated number of OVSF codes, M, to use in the computation of POVSF may be provided by higher layer signaling and/or some other mechanism, e.g., on a regular basis or whenever there is a change. In another design, M may be assumed to be equal to the maximum number of OVSF codes for the HS-PDSCH (i.e., M=15) or equal to some other predetermined value. In any case, $P_{OVSF}$ may be obtained by uniformly distributing the available transmit power across the M OVSF codes, as follows:

$$P_{OVSF}=P_{HSPDSCH}-10\cdot\log_{10}(2\cdot M), \text{ in dB.} \qquad \text{Eq (3)}$$

In equation (3), subtraction in dB is equivalent to division in linear unit. The factor of 2 within the $\log_{10}$ term assumes that $P_{HSPDSCH}$ is distributed evenly between two transport blocks.

The UE may estimate the SINR of each transport block based on $P_{OVSF}$ for that transport block. The UE may then map the SINR of each transport block to a CQI index based on a CQI mapping table, which may also be referred to as a CQI indexing table. The CQI mapping table may have L entries for L possible CQI levels, where L may be any suitable value. Each CQI level may be associated with a set of parameters for a transport block as well as a required SINR. The L CQI levels may be associated with increasing required SINRs. For each transport block, the UE may select the highest CQI level with a required SINR that is lower than the estimated SINR of that transport block. The CQI index for each transport block would indicate one of L possible CQI levels.

Figure 4:
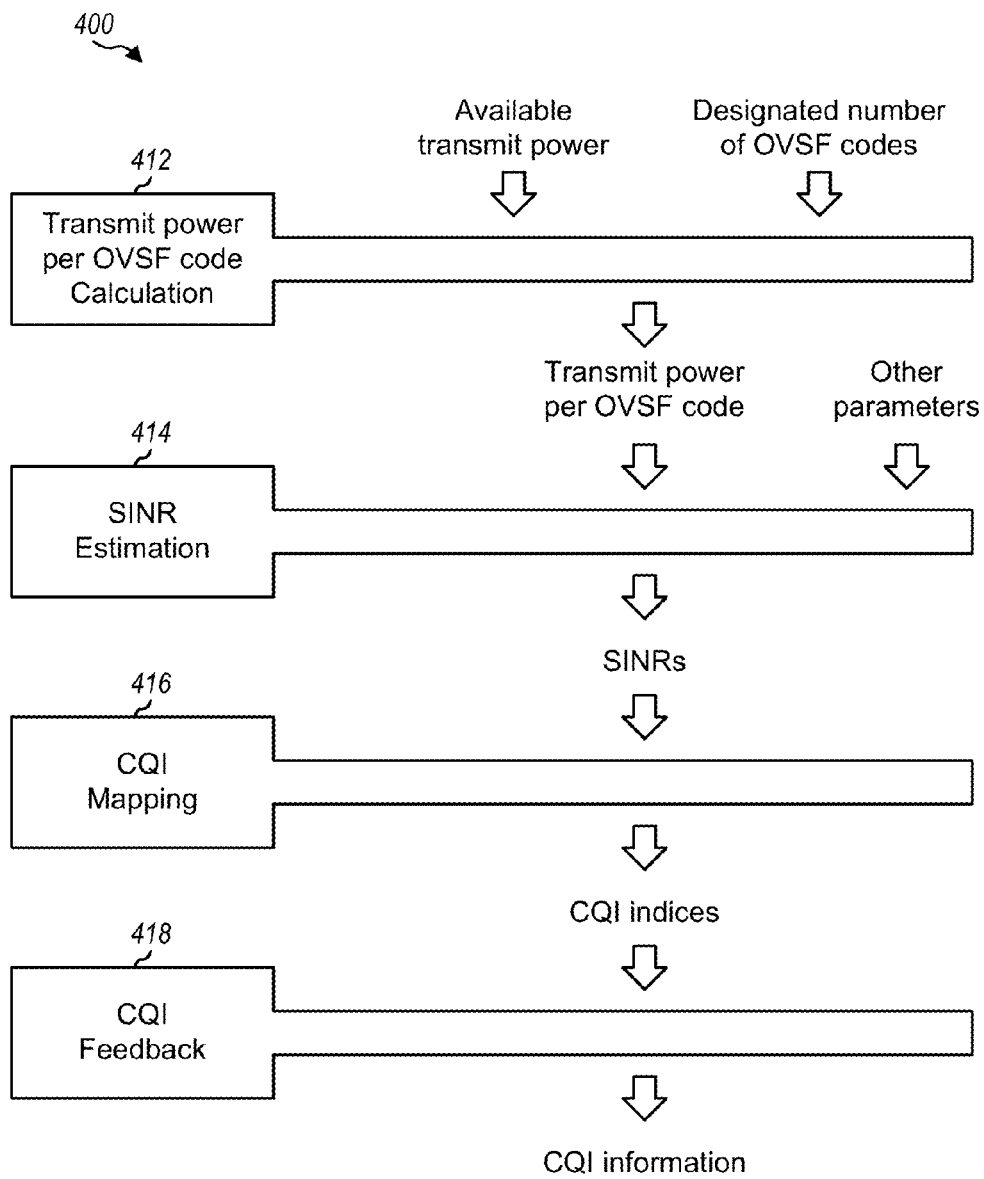
FIG. 4 shows a process for determining CQI information.

FIG. 4 shows a process 400 for determining CQI indices for multiple (e.g., two) transport blocks. The transmit power per OVSF code, $P_{OVSF}$, may be determined based on the available transmit power, $P_{HSPDSCH}$, and the designated number of OVSF codes, M, e.g., as shown in equation (3) (block 412). The SINRs of the transport blocks may be estimated based on the transmit power per OVSF code and other parameters and in accordance with an SINR function (block 414). The SINRs of the transport blocks may be mapped to CQI indices based on a CQI mapping table (block 416). The CQI indices may be sent to the Node B (block 418) and may be used by the Node B to transmit multiple transport blocks to the UE.

A CQI mapping table may be defined in various manners. The number of entries in the table, L, may be selected based on various factors such as the range of SINRs to be covered by the table, the desired granularity between adjacent CQI levels, the number of bits to use for the CQI information, etc. In one design, L=15, and the CQI mapping table includes 15 entries for 15 possible CQI levels. Each CQI level may be associated with a set of parameters that may include a transport block size and a modulation scheme. The set of parameters may also implicitly or explicitly include other parameters such as code rate.

In general, for a given target block error rate (BLER), a higher code rate and a higher modulation order may be used for higher SINR, and vice versa. A set of modulation schemes may be supported for HSDPA. The highest order modulation scheme may be used for higher SINRs, and the lowest order modulation scheme may be used for lower SINRs. A range of code rates (e.g., from 1/3=0.333 to 1) may also be supported for HSDPA. A higher code rate (e.g., near 1) provides less redundancy and may be used for higher SINR. Conversely, a lower code rate (e.g., 0.333) provides more redundancy and may be used for lower SINR.

Table 2 shows a CQI mapping table in accordance with one specific design. This design assumes (i) the designated number of OVSF codes for the HS-PDSCH is M=15, (ii) quadrature phase shift keying (QPSK) and 16-level quadrature amplitude modulation (16QAM) may be used for HSDPA, and (iii) the code rate can range from 0.333 to 1. In this CQI mapping table, each CQI level is associated with a specific transport block size and a specific modulation scheme. The 15 CQI levels in the table are defined based on a spacing of approximately 1.0 to 1.5 dB in SINR between adjacent CQI levels.

TABLE 2

CQI Mapping Table for M = 15 OVSF codes for HS-PDSCH

| CQI Level | Transport Block Size | Modulation | Code Rate | Additional Offset (in dB) | Equivalent AWGN SINR per symbol (in dB) |
|---|---|---|---|---|---|
| 0 | 4834 | QPSK | 0.333 | −5.0 | −1.24 |
| 1 | 4834 | QPSK | 0.333 | −3.0 | −1.24 |
| 2 | 4834 | QPSK | 0.333 | −1.5 | −1.24 |
| 3 | 4834 | QPSK | 0.333 | 0 | −1.24 |
| 4 | 6101 | QPSK | 0.424 | 0 | 0.27 |
| 5 | 7564 | QPSK | 0.525 | 0 | 1.58 |
| 6 | 9210 | QPSK | 0.640 | 0 | 3.09 |
| 7 | 10629 | QPSK | 0.738 | 0 | 4.29 |
| 8 | 12488 | 16QAM | 0.434 | 0 | 5.70 |
| 9 | 14936 | 16QAM | 0.519 | 0 | 6.86 |
| 10 | 17548 | 16QAM | 0.609 | 0 | 8.46 |
| 11 | 20251 | 16QAM | 0.703 | 0 | 9.75 |
| 12 | 22147 | 16QAM | 0.769 | 0 | 11.5 |
| 13 | 24222 | 16QAM | 0.841 | 0 | 12.17 |
| 14 | 26352 | 16QAM | 0.915 | 0 | 13.72 |

For each required SINR shown in column 6 of Table 2, the modulation scheme and code rate that can maintain a block error rate at or below the target BLER may be determined by computer simulation, measurements, etc. As shown in Table 2, the highest code rate of 0.915 and the highest order modulation scheme of 16-QAM are used for the highest CQI level of 14. The code rate drops for each lower CQI level until a code rate of 0.434 for CQI level of 8. A lower order modulation scheme of QPSK is used for the next lower CQI level of 7, and the resulting code rate is 0.738. The code rate again drops for each lower CQI level until a code rate of 0.333 for CQI level of 3.

The transport block size for each CQI level may be determined as follows. A TTI covers 7680 chips, and 480 modulation symbols may be sent with one 16-chip OVSF code in one TTI. A total of 480×15=7200 modulation symbols may be sent with fifteen 16-chip OVSF codes on the HS-PDSCH in one TTI. For QPSK, two code bits may be sent in each modulation symbol, and a total of 14,400 code bits may be sent in 7200 modulation symbols. For 16QAM, four code bits may be sent in each modulation symbol, and a total of 28,800 code bits may be sent in 7200 modulation symbols. The transport block size is equal to the number of code bits times the code rate.

In one design, when the lowest code rate and the lowest order modulation scheme have been reached, the same transport block size is repeated for all lower CQI levels. In the example shown in Table 2, the transport block size of 4834 is repeated for CQI levels 0, 1 and 2. The SINRs achieved by the UE for CQI levels 0, 1 and 2 may be lower than the required SINR for QPSK and code rate 0.333. The expected difference between the SINR achieved by the UE for each of CQI levels 0, 1 and 2 and the required SINR for CQI level 3 is shown by column 5 of Table 2. A higher BLER may result for a transport block sent for CQI level 0, 1 or 2, but this transport block may be retransmitted if received in error. In another design, when the lowest code rate and the lowest order modulation scheme have been reached, the transport block size may be reduced, and some bits may be repeated to improve reliability. In yet another design, when the lowest code rate and the lowest order modulation scheme have been reached, the number of OVSF codes may be reduced, and the transport block size may be reduced correspondingly. For example, a transport block size of 3172 may be sent with 10 OVSF codes for CQI level 2, a transport block size of 2212 may be sent with 7 OVSF codes for CQI level 1, and a transport block size of 1262 may be sent with 4 OVSF codes for CQI level 0.

In general, a CQI mapping table may be defined to cover any range of SINRs and with any granularity between CQI levels. A CQI mapping table may be defined such that (i) the lowest CQI level 0 corresponds to the lowest code rate and the lowest order modulation scheme, (ii) the highest CQI level 14 corresponds to the highest code rate and the highest order modulation scheme, and (iii) there are no repeated entries in the table. A CQI mapping table may be defined to have approximately equal delta SINR between neighbor CQI levels. Alternatively, a CQI mapping table may be defined to have (i) a smaller delta SINR or finer granularity for a subrange that is more commonly used and (ii) a larger delta SINR or more coarse granularity for a subrange that is used less often.

Table 2 shows one specific design of a CQI mapping table for a case in which M=15. CQI mapping tables may also be defined for other values of M. For example, CQI mapping tables may be defined for 5, 10, and/or some other values of M. For a given value of M, multiple CQI mapping tables may also be defined for different ranges of SINRs and/or different granularity between CQI levels. If multiple CQI mapping tables are available, then one CQI mapping table may be selected for use, e.g., by the Node B and signaled to the UE, or vice versa.

The UE may map the SINR of each transport block to a CQI index based on a CQI mapping table selected for use. In one design, symmetric OVSF code allocation is employed, and the same number and same set of OVSF codes is used for two transport blocks. In this design, the CQI mapping table may be defined such that the same number of OVSF codes is used for all CQI levels. In another design, asymmetric OVSF code allocation is allowed, and the number of OVSF codes for the secondary transport block may be different (e.g., fewer) than the number of OVSF codes for the primary transport block. In this design, the CQI mapping table may have different numbers of OVSF codes for different CQI levels, e.g., fewer OVSF codes for one or more of the lowest CQI levels. The secondary transport block may be sent with a subset of the OVSF codes used for the primary transport block.

If a precoding matrix is selected, then the UE may separately determine two CQI indices for two transport blocks to be sent in parallel with the selected precoding matrix. If a precoding vector is selected, then the UE may determine one CQI index for one transport block to be sent with the selected precoding vector. The UE may send a single CQI value that can convey either one CQI index for one transport block or two CQI indices for two transport blocks. With a granularity of 15 CQI levels for each CQI index in the case of two transport blocks, a total of 15×15=225 CQI index combinations are possible for two transport blocks. If 8 bits are used for the single CQI value, then up to 256−225=31 levels may be used for the CQI index for one transport block.

In one design, the single CQI value may be determined as follows:

$$CQI = \begin{cases} 15 \times CQI_1 + CQI_2 + 31 & \text{when 2 transport blocks are preferred by the } UE \\ CQI_S & \text{when 1 transport block is preferred by the } UE \end{cases} \quad \text{Eq (4)}$$

where $CQI_S$ is a CQI index within $\{0 \ldots 30\}$ for one transport block, $CQI_1$ is a CQI index within $\{0 \ldots 14\}$ for the primary transport block, $CQI_2$ is a CQI index within $\{0 \ldots 14\}$ for the secondary transport block, and CQI is an 8-bit CQI value for one or two transport blocks.

In the design shown in equation (4), a CQI value within a range of 0 through 30 is used to convey a CQI index for one transport block, and a CQI value within a range of 31 through 255 is used to convey two CQI indices for two transport blocks. The UE may also map the CQI index or indices for one or two transport blocks to a single CQI value in other manners. Computer simulations indicate that an 8-bit CQI value for one or two transport blocks can provide sufficiently accurate CQI information and good data performance. However, fewer or more bits may also be used for the CQI value.

Figure 5:
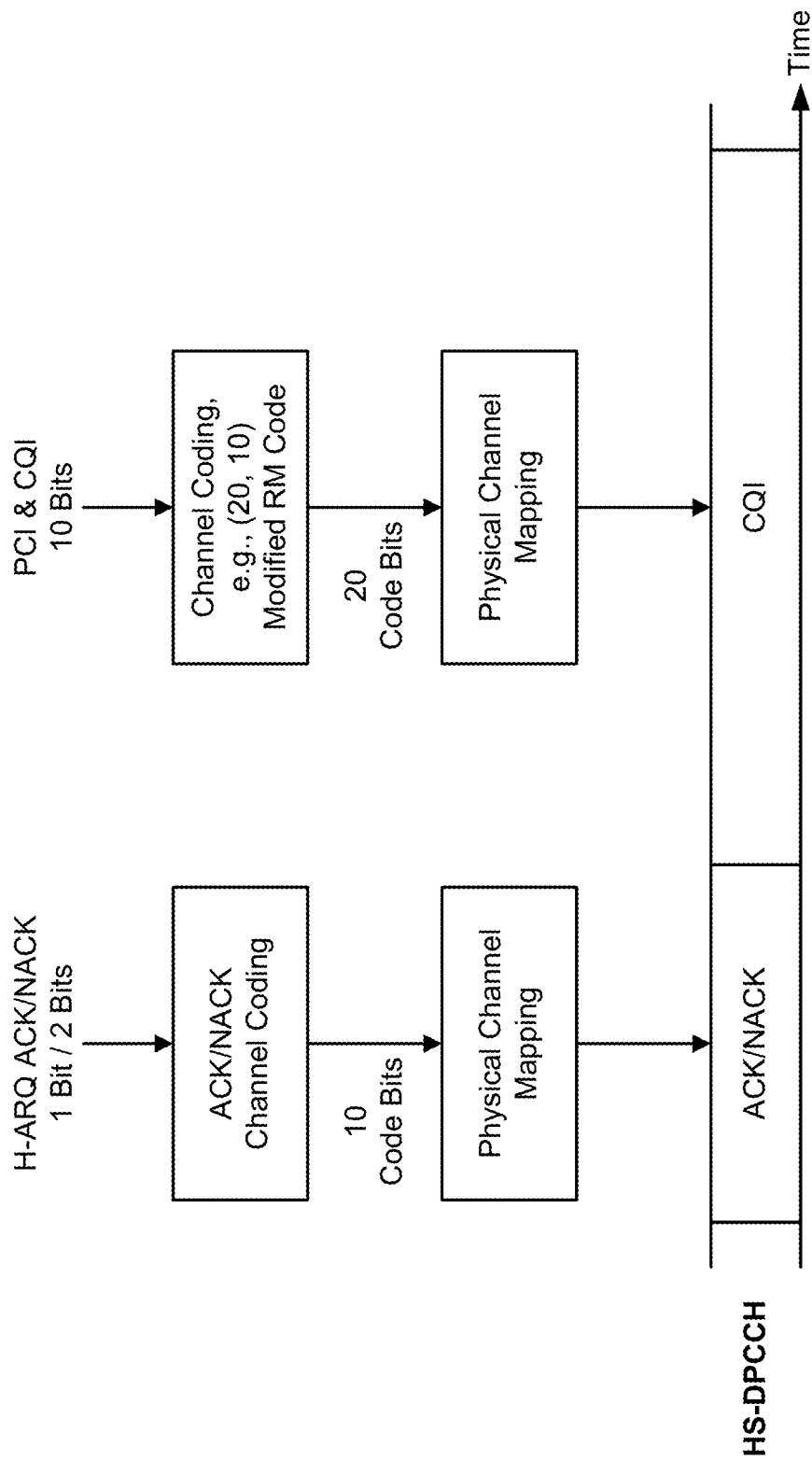
FIG. 5 shows a design for sending the CQI information.

FIG. 5 shows a design for sending PCI and CQI information on the HS-DPCCH. In each TTI, ACK/NACK information may be sent in the first slot of the TTI, and the PCI and CQI information may be sent in the second and third slots of the TTI. In each TTI, one ACK/NACK bit for one transport block or two ACK/NACK bits for two transport blocks may be channel encoded to obtain 10 code bits. The 10 code bits for ACK/NACK may be spread and mapped to the first slot of the TTI.

In one design, a PCI/CQI report includes two bits for PCI information and 8 bits for CQI information, which may comprise one 8-bit CQI value computed as shown in equation (4). The ten bits for the PCI/CQI report may be channel encoded with a (20, 10) block code, which may be a modified Reed-Muller (RM) code, to obtain a codeword of 20 code bits. The 20 code bits for the PCI/CQI report may be spread and mapped to the second and third slots of the TTI.

The Node B may receive the PCI/CQI report from the UE and determine whether the UE prefers one or two transport blocks and the CQI index for each preferred transport block based on the reported CQI value. The Node B may transmit the number of transport blocks preferred by the UE or fewer transport blocks. For example, if the UE prefers two transport blocks, then the Node B may transmit zero, one, or two transport blocks to the UE.

The UE may determine the CQI index for each transport block based on $P_{OVSF}$, which may be determined based on the designated number of OVSF codes, M. The Node B may have K OVSF codes available for the HS-PDSCH, where K may or may not be equal to M. If K=M, then the Node B may transmit each transport block with the K OVSF codes at $P_{OVSF}$ to the UE.

If K<M, then in one design the Node B may scale down the transport block size by a factor of K/M and may transmit a transport block of a smaller size with the K OVSF codes at $P_{OVSF}$ to the UE. For example, if K=10, M=15, and a transport block size of S is selected by the UE, then the Node B may transmit a transport block of size 10·S/15 with 10 OVSF codes at $P_{OVSF}$ to the UE. This design may ensure that the SINR of the transmitted transport block closely matches the SINR estimated by the UE since the same $P_{OVSF}$ is used for both SINR estimation by the UE and data transmission by the Node B. In another design, the Node B may scale up $P_{OVSF}$ by a factor of up to M/K and may then transmit a transport block of size S or larger at the higher $P_{OVSF}$ to the UE. The Node B may predict the improvement in SINR with the higher $P_{OVSF}$ and may select the transport block size accordingly.

If K>M, then in one design the Node B may scale up the transport block size by a factor of K/M and may transmit a transport block of a larger size of K·S/M with the K OVSF codes at $P_{OVSF}$ to the UE. In another design, the Node B may scale down $P_{OVSF}$ by a factor of up to M/K and may then transmit a transport block of size S or smaller at the lower $P_{OVSF}$ to the UE.

Figures 6, 7:
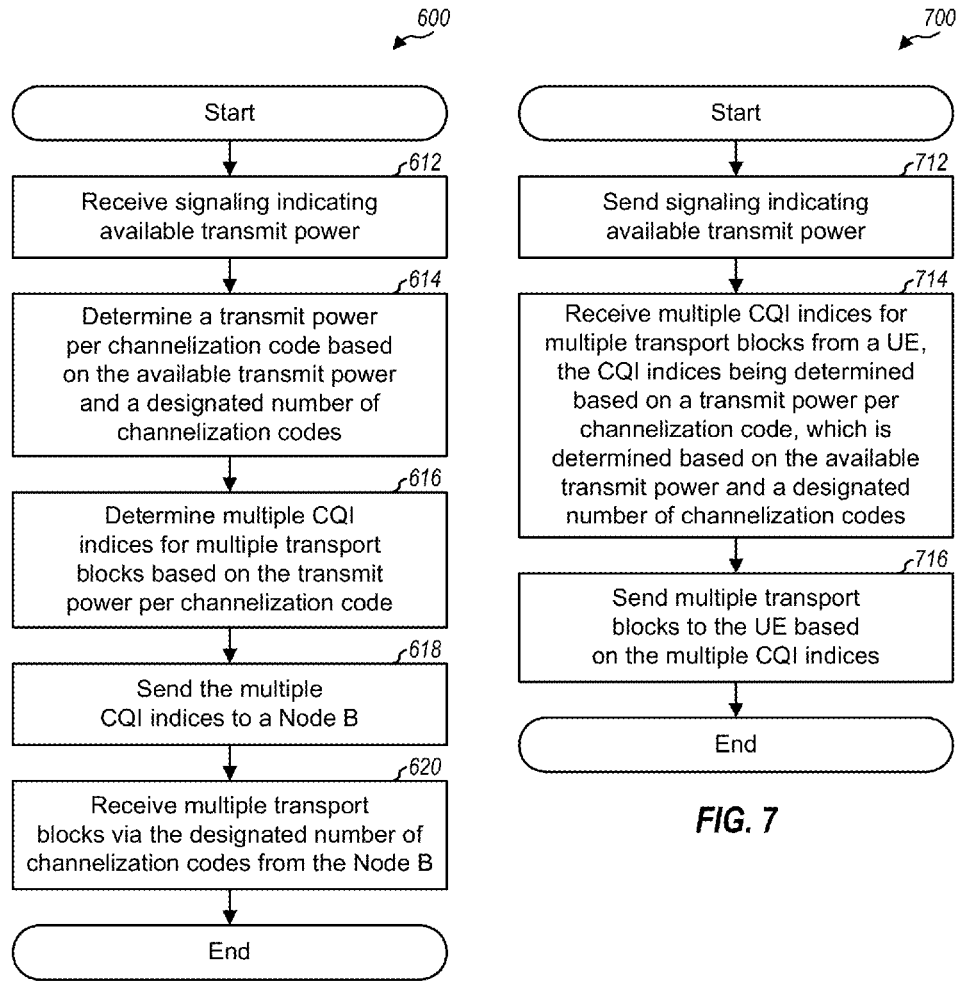
FIG. 6 shows a process performed by the UE.
FIG. 7 shows a process performed by the Node B.

FIG. 6 shows a design of a process 600 performed by the UE (or a receiver). Signaling indicating the available transmit power may be received from the Node B (or a transmitter) or may be obtained in some other manner (block 612). A transmit power per channelization code may be determined based on the available transmit power and the designated number of channelization codes (block 614). The available transmit power may be the actual transmit power for data transmission. Alternatively, the available transmit power may be a hypothetical value to use in determining the transmit power per channelization code and may be potentially different from the actual transmit power. For example, the Node B may use all of its available transmit power on less than the designated number of channelization codes, and the available transmit power for the designated number of channelization codes may be a hypothetical value that is greater than the transmit power actually available at the Node B. A channelization code may be an OVSF code or some other type of code. The designated number of channelization codes may be the maximum number of channelization codes (which is 15 in HSDPA) or some other fixed number of channelization codes that is known by both the UE and the Node B. The designated number of channelization codes may also be obtained via signaling from the Node B. The transmit power per channelization code may be determined by uniformly distributing the available transmit power across all transport blocks and across the designated number of channelization codes.

Multiple CQI indices for multiple transport blocks to be sent in parallel in a MIMO transmission may be determined based on the transmit power per channelization code (block 616). For block 616, the SINRs of the multiple transport blocks may be estimated based on the transmit power per channelization code. The SINRs may then be mapped to CQI indices based on a CQI mapping table for the designated number of channelization codes. The CQI mapping table may be one of multiple CQI mapping tables for (i) different designated numbers of channelization codes and/or (ii) different mappings of transport block parameters to CQI levels for the designated number of channelization codes.

The multiple CQI indices may be sent to the Node B (block 618). Thereafter, multiple transport blocks may be received via the designated number of channelization codes from the Node B (block 620). The transport blocks may be transmitted at the transmit power per channelization code by the Node B. Alternatively, the multiple transport blocks may be received via a second number of channelization codes, which may be fewer or more than the designated number of channelization codes. The sizes of the transport blocks and/or the transmit power per channelization code may be scaled up or down based on the designated number of channelization codes and the second number of channelization codes.

FIG. 7 shows a design of a process 700 performed by the Node B (or a transmitter). Signaling indicating the available transmit power may be sent to the UE (or a receiver) (block 712). Signaling indicating the designated number of channelization codes may also be sent to the UE. Alternatively, the UE may already know the designated number of channelization codes. Multiple CQI indices for multiple transport blocks may be received from the UE (block 714). The CQI indices may be determined by the UE based on the transmit power per channelization code, which may be determined based on the available transmit power and the designated number of channelization codes.

Multiple transport blocks may be sent in a MIMO transmission to the UE based on the multiple CQI indices (block 716). In one design, the multiple transport blocks may be sent with the designated number of channelization codes and at the transmit power $P_{OVSF}$ per channelization code to the UE. In another design, the sizes of the transport blocks may be scaled up or down based on the designated number of channelization codes and a second number of channelization codes. The transport blocks may then be sent with the second number of channelization codes and at the transmit power $P_{OVSF}$ per channelization code to the UE. In yet another design, the transmit power per channelization code may be scaled up or down based on the designated number of channelization codes and the second number of channelization codes. The transport blocks may then be sent with the second number of channelization codes and at the scaled transmit power per channelization code to the UE.

For symmetric code allocation, the Node B may send each transport block with a common set of channelization codes. For asymmetric code allocation, the Node B may send one transport block (e.g., a primary transport block) with a set of channelization codes and may send another transport block (e.g., a secondary transport block) with a subset of this set of channelization codes.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining precoding control indicator (PCI) information and channel quality information at a user equipment (UE), wherein the channel quality information comprises a channel quality indicator (CQI) index for each of at least one transport block to be transmitted to the UE, wherein the CQI index for each transport block is selected based on an estimated Signal to Interference Noise Ratio (SINR) of the transport block, wherein the SINR for each transport block is estimated based on a transmit power per channelization code assigned to the transport block, the transmit power per channelization code to be used for a downlink data channel for carrying the at least one transport block;
   jointly encoding the PCI information and the channel quality information to obtain coded data; and
   sending the coded data from the UE to a base station.

2. The method of claim 1, wherein the jointly encoding comprises jointly encoding the PCI information and channel quality information based on a block code.

3. The method of claim 1, wherein the PCI information indicates a particular number of transport blocks to transmit to the UE.

4. The method of claim 1, wherein the PCI information comprises a precoding matrix or vector to use for transmitting data to the UE.

5. The method of claim 1, further comprising:
   receiving a data transmission sent by the base station in accordance with the PCI information and the channel quality information from the UE.

6. The method of claim 1, further comprising:
   determining acknowledgement (ACK) information for a received data transmission at the UE; and
   sending the ACK information with the PCI information and the channel quality information on the control channel.

7. The method of claim 1, wherein determining the channel quality information comprises determining a Channel Quality Indicator (CQI) value as a function of a first CQI index for a first transport block and a second CQI index for a second transport block.

8. An apparatus for wireless communication, comprising:
   at least one processor configured to determine precoding control indicator (PCI) information and channel quality information at a user equipment (UE), to jointly encode the PCI information and the channel quality information to obtain coded data, and to send the coded data from the UE to a base station, wherein the channel quality information comprises a channel quality indicator (CQI) index for each of at least one transport block to be transmitted to the UE, wherein the CQI index for each transport block is selected based on an estimated Signal to Interference Noise Ratio (SINR) of the transport block, wherein the SINR for each transport block is estimated based on a transmit power per channelization code assigned to the transport block, the transmit power per channelization code to be used for a downlink data channel for carrying the at least one transport block; and a memory coupled to the at least one processor.

9. The apparatus of claim 8, wherein the at least one processor is configured to jointly encode the PCI information and channel quality information based on a block code.

10. The apparatus of claim 8, wherein the PCI information indicates a particular number of transport blocks to transmit to the UE, or a precoding matrix or vector to use for transmitting data to the UE, or a combination thereof.

11. The apparatus of claim 8, wherein the at least one processor is configured to determine the channel quality information by determining a Channel Quality indicator (CQI) value as a function of a first CQI index for a first transport block and a second CQI index for a second transport block.

12. An apparatus for wireless communication, comprising:

means for determining precoding control indicator (PCI) information and channel quality information at a user equipment (UE), wherein the channel quality information comprises a channel quality indicator (CQI) index for each of at least one transport block to be transmitted to the UE, wherein the CQI index for each transport block is selected based on an estimated Signal to Interference Noise Ratio (SINR) of the transport block, wherein the SINR for each transport block is estimated based on a transmit power per channelization code assigned to the transport block, the transmit power per channelization code to be used for a downlink data channel for carrying the at least one transport block;

means for jointly encoding the PCI information and the channel quality information to obtain coded data; and means for sending the coded data from the UE to a base station.

13. The apparatus of claim 12, wherein the means for jointly encoding comprises means for jointly encoding the PCI information and channel quality information based on a block code.

14. The apparatus of claim 12, wherein the PCI information indicates a particular number of transport blocks to transmit to the UE, or a precoding matrix or vector to use for transmitting data to the UE, or a combination thereof.

15. The apparatus of claim 12, wherein the means for determining the channel quality information is configured to determine a Channel Quality Indicator (CQI) value as a function of a first CQI index for a first transport block and a second CQI index for a second transport block.

16. A non-transitory computer-readable medium comprising code executable by one or more processors for:

determining precoding control indicator (PCI) information and channel quality information at a user equipment (UE), wherein the channel quality information comprises a channel quality indicator (CQI) index for each of at least one transport block to be transmitted to the UE, wherein the CQI index for each transport block is selected based on an estimated Signal to Interference Noise Ratio (SINR) of the transport block, wherein the SINR for each transport block is estimated based on a transmit power per channelization code assigned to the transport block, the transmit power per channelization code to be used for a downlink data channel for carrying the at least one transport block, jointly encoding the PCI information and the channel quality information to obtain coded data; and sending the coded data from the UE to a base station.

17. The computer-readable medium of claim 16, wherein the code for determining the channel quality information comprises code for determining a Channel Quality Indicator (CQI) value as a function of a first CQI index for a first transport block and a second CQI index for a second transport block.

* * * * *